R. A. MABRY.
RESTAURANT SERVING MECHANISM.
APPLICATION FILED JUNE 3, 1920.
1,367,161.
Patented Feb. 1, 1921.
2 SHEETS—SHEET 1.
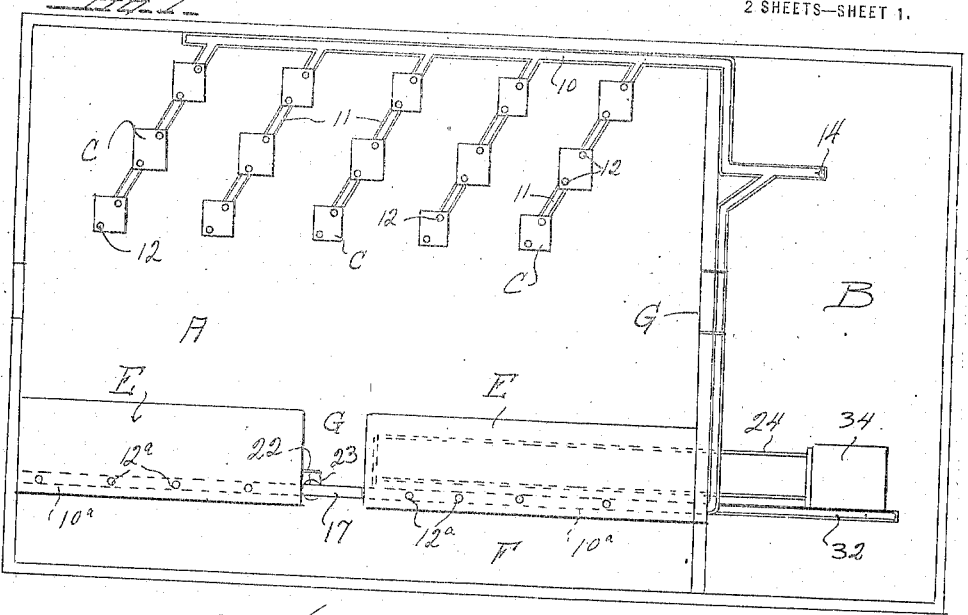
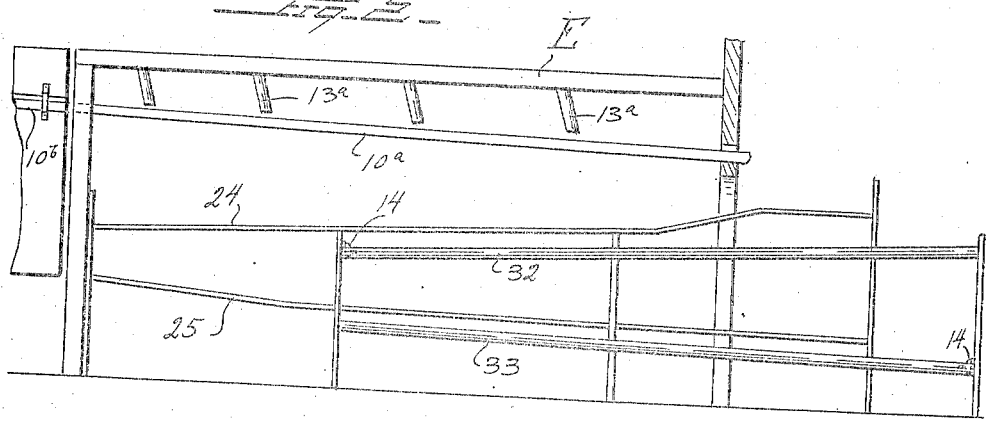
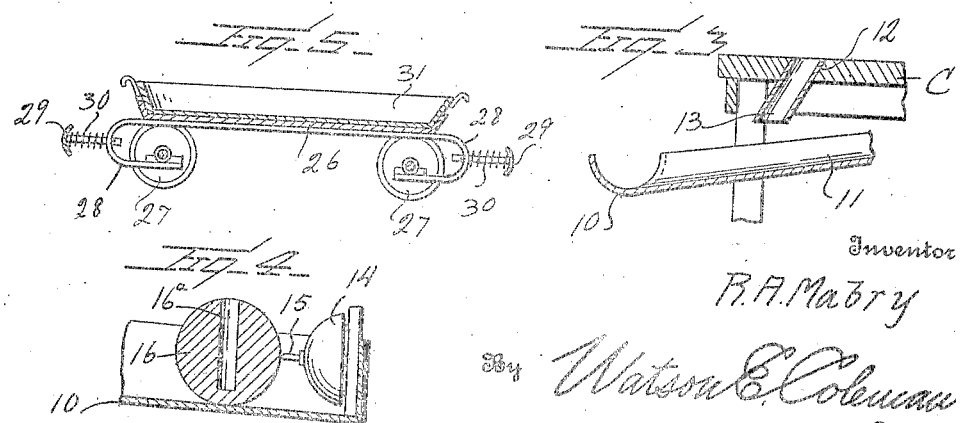
Inventor
R. A. Mabry
By Watson E. Coleman
Attorney R. A. MABRY.
RESTAURANT SERVING MECHANISM.
APPLICATION FILED JUNE 3, 1920.
1,367,161.
Patented Feb. 1, 1921.
2 SHEETS—SHEET 2.
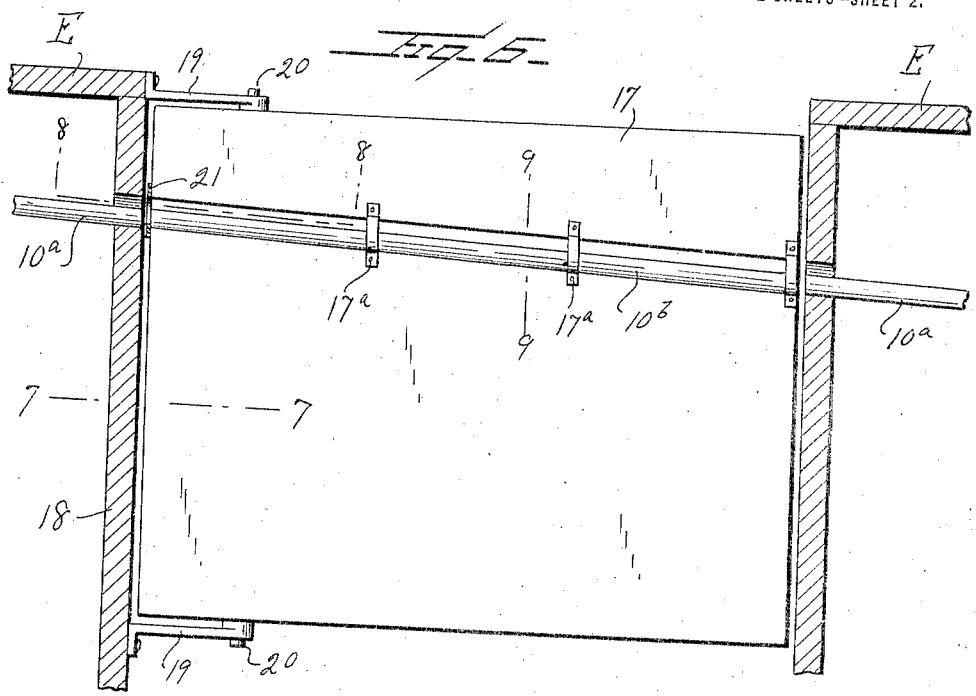
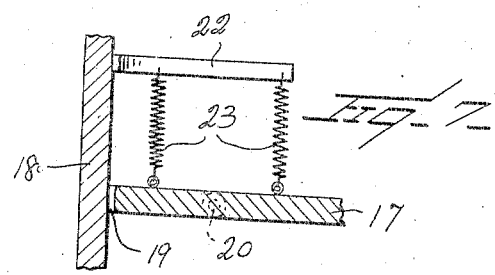
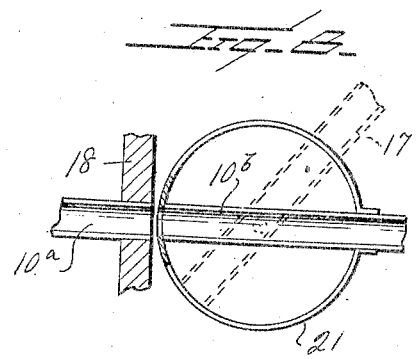
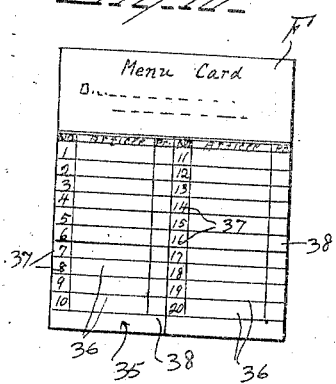
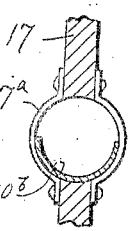
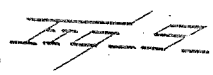
Inventor
R. A. Mabry
By Watson E. Coleman
Attorney

UNITED STATES PATENT OFFICE.

RAYMOND A. MABRY, OF TEMPLE, TEXAS.

RESTAURANT SERVING MECHANISM.

1,367,161.   Specification of Letters Patent.   Patented Feb. 1, 1921.

Application filed June 3, 1920. Serial No. 386,319.

*To all whom it may concern:*

Be it known that I, RAYMOND A. MABRY, a citizen of the United States, residing at Temple, in the county of Bell and State of Texas, have invented certain new and useful Improvements in Restaurant Serving Mechanism, of which the following is a specification, reference being had to the accompanying drawings.

This invention relates to restaurant equipment, and particularly to means whereby orders may be transferred from tables in a restaurant to the kitchen, and whereby food may be transferred from the kitchen to the dining room.

The general object of my invention is to provide means whereby orders may be expeditiously transferred from a guest to the kitchen without the intermediation of a waiter, and in their regular order, and whereby the food may be transferred from the kitchen to the dining room without a waiter and then taken to the guest's table from the serving counter by the waiter, thus materially economizing in the amount of help required in a restaurant and economizing in the time consumed in serving orders.

A further object is to provide means whereby the chef or other person in authority in the kitchen will be notified when an order has been received, and whereby the food may be placed upon trays, in turn disposed upon a carriage and by the carriage transferred into the dining room to the serving counter, the construction being such as to permit the trays to be removed from the carriage and the carriage returned to the kitchen and the tray used by the waiter to carry the food to the customer.

A further object is to provide a construction of this kind wherein trough-like conveyers are used in which the order-holding balls or like rolling members may be used to carry the orders to the kitchen or carry messages from the kitchen to the waiter at the counter, and in this connection provide means associated with each table or with counters whereby the guests may deposit the order containing balls within the container chute of a trough.

Another object is to provide a construction of this character wherein the counter behind which the waiter or other person normally stands is formed with a door, the doorway intersecting the chute or conveyer before referred to, by which the orders are taken to the kitchen, and the door being so constructed that a section of the chute is carried through the door and swings therewith, and being further constructed so that when the door is opened passage of the rotatable elements through the chute is prevented until the door is again closed.

A further object is to provide a menu card and order blank peculiarly designed to be used in connection with a restaurant equipped with the appliance heretofore referred to.

Other objects will appear in the course of the following description.

My invention is illustrated in the accompanying drawings, wherein:—

Figure 1 is a diagrammatic top plan view of a restaurant arranged in accordance with my invention;

Fig. 2 is a side elevation looking at the rear of counter E;

Fig. 3 is a fragmentary sectional view through one of the tables C and the corresponding chute 11;

Fig. 4 is a detail sectional view of the kitchen end of chute 10 showing the order carrying ball in section;

Fig. 5 is a longitudinal sectional view of the tray carrying car or truck;

Fig. 6 is a side elevation of the gate;

Fig. 7 is a section on the line 7—7 of Fig. 6;

Fig. 8 is a section on the line 8—8 of Fig. 6;

Fig. 9 is a section on the line 9—9 of Fig. 6;

Fig. 10 is a face view of the menu card;

Fig. 11 is a face view of the order card.

Referring to these drawings, and particularly to Fig. 1, A designates the dining room of a restaurant, and B the kitchen thereof. Within the restaurant are disposed a plurality of tables C arranged, as illustrated, in transversely diagonal lines, and on the opposite side of the restaurant there is disposed a counter E, which may be a counter at which food is served and eaten, or perform the function of a mere serving table or counter to which the food is delivered and from which the waiter carries the food to the various tables.

It will be understood that I may equip the dining room with counters E alone and do away with the tables C, or the dining room might be equipped with the tables C and the counters E not be used as counters for eating at all but merely for serving. Behind the counter E is a passageway F wherein the waiter or waiters ordinarily stand.

Extending longitudinally along one side of the dining room and entering the kitchen is a trough-shaped conveyer 10 which, however, might be tubular in form if desired, and extending through or adjacent to the several rows of tables are lateral branch conveyers 11 which may be in the form of troughs or of tubes. If these conveyers are in the form of tubes intersecting the tables C, openings 12 are formed in each table, either one opening in the middle of the table or two openings adjacent the corners of the table, for instance, which openings discharge into the troughs 11 by means of vertical pipes 13, if desired, depending upon the distance of the branch pipes or tubes 11 from the surface of the table. These branch pipes or tubes 11 will, of course, incline downwardly and laterally toward the chute or trough 10 and discharge thereinto. The trough 10 extends longitudinally and downwardly toward the kitchen so that the ball or other object discharged into the trough 10 from one of the branch chutes 11 will roll into the kitchen B. The trough 10 at its extremity within the kitchen B has at its end a bell 14, which bell may be of any suitable character, but is provided with a bell sounding stem 15.

I have illustrated a ball 16 as being the means whereby an order is carried from a guest at any one of the tables C into the kitchen. This ball may be made of wood and may be either formed in two sections screwed together like the change carriers in a cash carrier system, or, as illustrated, may have the diametrically extending recess 16ª or bore where the order, rolled up, is placed. In any case, the guest deposits his order within the recess 16ª, drops the ball through the proper opening into the chute 11 or otherwise deposits the ball in the chute, and the ball rolls down the chute 11 to the chute 10 and travels on until it reaches that portion of the chute in the kitchen and then strikes the bell 16, sounding the bell so as to warn the chef that an order has been received.

I have also illustrated a chute 10ª extending longitudinally along behind the counter E, then extending laterally and intersecting the chute 10 within the kitchen so that orders may be deposited through openings 12ª in the counter into this chute and thence carried to the kitchen by means of the ball 16 in the same manner as heretofore described. It is, of course, necessary or desirable to provide an opening in this counter E through which the waiter may pass from the space behind the counter into the dining room so as to wait upon the guests at the tables. To this end, I form a gap G in the counter E, and this gap is normally closed by a gate 17. This gate is preferably made in two sections. The upper section has its lower edge inclined downwardly and toward the kitchen, the lower portion having its upper edge inclined downwardly and toward the kitchen. These sections are joined at intervals by straps 17ª, and disposed between these sections and held in place by the straps 17ª is the conveyer section 10ᵇ which may be tubular or in the form of a trough, as desired.

The gate is hinged to the corner post 18 or end of the counter section by any suitable hinges which will permit the gate to swing in both directions, and I have illustrated these hinges as comprising staples or equivalent elements 19 having eyes through which trunnions 20 pass, these trunnions being disposed inward of the rear end of the gate. Carried upon the gate and extending longitudinally over the space between the upper and lower sections of the gate are the outwardly bowed shields 21 which, when the gate turns from a position in alinement with the chute 10ª at the rear end of the gate, close the forward end of the chute section 10ª and prevent the discharge of the carrier balls into the chute section 10ᵇ carried by the gate. The gate may be, as before remarked, pivotally mounted for oscillation in either direction beyond its middle position and is yieldingly held in its middle position by a spring or springs, but I have illustrated for this purpose an arm 22 attached to the end of the counter or post 18, this arm extending out some distance from the gate and being provided with springs 23 engaging the gate. There are two of these springs 23 and they are located on opposite sides of the axial center of the gate, that is the rotative center which extends through the trunnions 20 so that when the gate is oscillated in one direction, one of these springs will be relaxed and the other tensioned, and thus the gate always returns to its middle position from a swinging movement in either direction. Of course, I do not wish to be limited to the details which I have illustrated for this gate, as it is obvious that it might be constructed and mounted in a different way without departing from the spirit of the invention. Of course, it will be understood that gates may be disposed in any portion of the length of the chutes 10 or 10ª. For instance, there may be a gate disposed between the dining room and the kitchen, and these gates, if any others are used, will be constructed in the same manner as the gate 16 before described.

For the purpose of carrying the food ordered to the counter E, I provide a downwardly extending track leading from the kitchen into the space beneath the counter E at one side of the gate, this track being designated 24. There are two rails of this track mounted on a suitable supporting structure, and from the terminal end of the track 24 but below the same extends a track 25 extending at a downward inclination into the kitchen. A car 26 having wheels 27 is adapted to run on these tracks, this car having a tray-like body supported on the axles in any suitable manner, as by the curved bars 28, which curved bars in turn support the bearings for the wheels. These curved bars carry at their ends the buffers 29 which are urged outward by springs 30. There is a buffer on each end of the car so that when the car reaches the end of the tracks in either direction, it will be stopped without such jar as would tend to disarrange the food carried on the car. Capable of being disposed within the tray-like body 26 is a serving tray 31 having handles whereby it may be easily manipulated, this tray fitting within the tray-like body 26 and the handles extending upward and laterally so as to make the tray convenient to handle.

One or more cars are used and the cars are adapted to be disposed upon the upper tracks 24 in the kitchen and then allowed to pass downward through a suitable aperture in the wall to the discharge end of the track. There the waiter lifts out the tray 31 with the food therein and carries the food to the customer, or deposits the tray on the counter and then removes the truck or car, places it on the lower track 24, and it returns to the kitchen for another order. After removing the tray from the car, the waiter carries it to that table whose number is on the order blank which the chef has deposited in the car. A suitable clip may be provided upon the tray in which the order blank may be supported, or any other means may be provided for holding the order blank and preventing its becoming lost off the tray.

Sometimes it may be necessary for the chef or other person within the kitchen to send a message to the waiter or counter man, as for instance, that food which has been ordered cannot be served, or the order is not understood, or the like, and for that purpose I provide a second trough-like chute 32 extending downward from the kitchen into the space behind the counter and a lower chute 33 extending from the space behind the counter downward into the kitchen. A ball or balls, such as the ball 16, are used for the purpose of carrying messages back and forth between the kitchen and the counter man. The counter end of the upper chute is provided with a bell, such as the bell 14, operated in the same manner by the arrival of a ball, and the kitchen end of the lower chute 33 is also provided with a bell of the same character so that when a ball containing a message arrives beneath the counter, it will sound a signal bell, warning the waiter, and on its return, when it arrives in the kitchen, it will sound the signal bell.

It will be noted that the conveyer or trough 10$^a$ extends beneath the rear edge of the counter E and that the counter is provided with openings 12$^a$, these openings being preferably connected by small sections of pipe 13$^a$ to the chute. Of course, the chutes 32 and 33 terminate short of the outer end of the tracks 24 and 25 so as to permit the removal of the truck or carriage 26. A table 34 is preferably provided within the kitchen adjacent to the end of the track 24 and track 25 upon which the chef may place the trays which are to be despatched into the dining room.

For the purpose of communicating orders to the chef from the customer, I provide a menu card, designated by F and illustrated in Fig. 10. This menu card will have the articles of food stated in columns 35, these columns being intersected by transverse lines to form spaces 36 within which the name of the article is to be written or printed, each space 36 being preceded by a number space 37 and succeeded by a price space 38. The seats of the tables are numbered consecutively, and the combination order card and check 39 has at its top a plate number, that is a number indicating the seat from which the order card came, and also preferably has a serial number so that the total number of diners or guests served at the end of the day may be easily computed. This combination order card and check 39 is divided into squares indicated in Fig. 11 as being numbered from 1 to 20 and corresponding to the number of articles on the menu card.

The guest orders what he desires by marking an X on the numbers on the order card corresponding to the numbers on the menu card which represent the articles wanted. Of course, it will be understood that the numbers on the menu card and the numbers on the order card may be as many as desired, and that where a list of "specials" are to be used each day, the numbers for them will begin with the next consecutive number from the last number on the regular menu card. Thus the order card may contain more than 20 spaces, 20 of these spaces being for the standard articles normally served and the remainder of the spaces for the specials.

After making a selection from the menu card and checking his order upon the order card, the customer rolls the card loosely in place in the cavity 16$^a$ in ball 16 and the ball is deposited in one of the openings 12 in the table and is carried by the conveyer 10 to the kitchen, where it rings the bell 15 and notifies the chef of its arrival. When the food is delivered to a customer, the numbers of the articles ordered will be punched through the order card to prevent the customer from erasing the mark over the articles ordered and selecting and marking numbers which represent articles of a cheaper price, as this card is used as a check to the cashier when the customer pays. The bill is rendered upon the columns at the lower portion of the card which are marked with cents, nickles, dimes and quarters. This is particularly designed for use with articles which are sold in the dining room, and this method prevents two sets of numbers from being used and the liability of patrons getting confused with two sets.

The menu card will, of course, have thereon instructions for the use of the order card and also instructions to the customers to write any special orders not listed or cooking instructions on the reverse side of the order card.

It will be understood, of course, that the conveyers 10ª may be entirely concealed so that they will not be obvious and that the tubular chutes 11 are relatively small, and may, if desired, be disposed in the floor of the restaurant, the pipes 13 extending downward at an inclination to the floor and entering these pipes or chutes.

I claim:—

1. In a restaurant having a dining room and a kitchen, a series of structures in the dining room whereat food may be eaten, means for conveying an order from any one of said structures into the kitchen, a serving counter in the dining room adjacent one wall thereof, mechanical means for conveying trays of food from the kitchen to the serving counter in the dining room and returning the empty trays of dishes from the serving counter back to the kitchen and disposed between the serving counter and the wall whereby said mechanical means shall be concealed from persons dining.

2. In a restaurant having a dining room and a kitchen, a wall disposed within the dining room and having an opening in its length, a swinging gate normally closing said opening, a gravity conveyer extending from the dining room to the kitchen and disposed adjacent said wall, a section of said conveyer being supported by the gate in alinement with the body of the conveyer when the gate is closed, order carriers insertible into said conveyer and adapted to travel by gravity through said conveyer to the kitchen, and means carried by the gate preventing passage of order carriers through that portion of the conveyer beyond the gate when the gate is open.

3. In a restaurant having a dining room and kitchen, a counter disposed within the dining room and having an opening in its length, a swinging gate normally closing said opening, and a gravity conveyer extending from the dining room to the kitchen and disposed beneath said counter, a section of said conveyer being supported by the gate in alinement with the body of the conveyer when the gate is closed, order carriers insertible into said conveyer and adapted to travel by gravity through said conveyer to the kitchen, and means carried by the gate for preventing passage of order carriers through that portion of the conveyer beyond the gate when the gate is opened.

4. In a restaurant having a dining room and a kitchen, a counter disposed within the dining room and having an opening in its length, a gate adapted to swing and normally closing said opening, and a sectional conveyer leading at a downward inclination from the dining room into the kitchen, one section of the conveyer being mounted on the counter beyond said opening, another section of the conveyer being mounted on the counter between the opening and the kitchen, and a third section of the conveyer being mounted upon the gate, the last named section being disposed in alinement with the first named sections when the gate is in its closed position, and shields carried by the gate and normally closing the exit end of the first named section when the gate is opened.

5. In a restaurant, a downwardly inclined order conveyer formed in sections and inclined in one direction, two of said sections being fixed, and a third section being disposed between the first named fixed sections, a support for the third named section hinged at one end for swinging movement and normally held in a position causing the sections to aline but movable to carry the third named section into angular relation to the first named sections, and shields disposed in conjunction and movable with the third named section and closing the outlet opening of that section discharging into the third named section when the gate is swung in either direction.

6. In a structure of the character described, a gravity conveyer including three sections, two of said sections being fixed, a gate adapted to swing in opposite directions and to which the third section is fixed at a point between the first named sections, springs urging said gate into a normal position where the third named section alines with the first named sections, and arcuate shields attached to said gate on opposite sides thereof and bowed outward in opposite directions and disposed concentrically to the pivotal center of the gate and acting to close the discharge end of that section discharging into the conveyer section mounted on the gate when the gate is opened in either direction.

7. In a structure of the character described, a conveyer including two downwardly extending sections spaced from each other, a gate disposed in the space between said sections, said gate having an upper portion and a lower portion, means supporting the gate for swinging movement in either direction, springs adapted to return the gate to normal position, a conveyer section mounted between the upper and lower portions of the gate and when the gate is in normal position forming a continuation of the two sections, members connecting the upper and lower portions of the gate, and outwardly bowed shields attached to the opposite sides of the gate in alinement with the conveyer section therein and concentric to the axis of the gate whereby to close the discharge end of that section of the conveyer which discharges into the section carried by the gate.

In testimony whereof I hereunto affix my signature.

RAYMOND A. MABRY.